United States Patent [19]

Mangone, Jr.

[11] Patent Number: 4,801,064
[45] Date of Patent: Jan. 31, 1989

[54] CABLE MOUNTING APPARATUS AND METHOD

[76] Inventor: Peter G. Mangone, Jr., 28600 Buchanan Dr., Evergreen, Colo. 80439

[21] Appl. No.: 804,064

[22] Filed: Dec. 3, 1985

Related U.S. Application Data

[63] Continuation-in-part of Ser. No. 740,802, Jun. 3, 1985.

[51] Int. Cl.$^4$ .......................... B27F 7/00; F16B 15/08
[52] U.S. Cl. .................................... 227/120; 227/135; 227/146; 227/147; 248/71; 411/442; 411/445
[58] Field of Search ............... 227/120, 135, 146, 147; 411/442–445, 908; 248/71, 74.5

[56] References Cited

U.S. PATENT DOCUMENTS

| | | | |
|---|---|---|---|
| 2,140,593 | 12/1938 | Pankonin | 411/443 X |
| 2,285,512 | 6/1942 | Harley | 227/146 |
| 2,637,030 | 5/1953 | Wickman et al. | 227/120 |
| 2,901,200 | 8/1959 | Voeks | 248/74.5 |
| 2,923,938 | 2/1960 | Rinehardt | 227/146 |
| 4,094,490 | 6/1978 | Einhorn | 411/443 X |
| 4,537,343 | 8/1985 | Johansson | 227/120 |

FOREIGN PATENT DOCUMENTS

| | | | |
|---|---|---|---|
| 0485193 | 7/1952 | Canada | 248/71 |
| 1366144 | 6/1964 | France | 206/340 |
| 2035601 | 12/1970 | France | . |
| 0797766 | 7/1958 | United Kingdom | 206/341 |
| 1544602 | 10/1979 | United Kingdom | . |

Primary Examiner—Carl E. Hall
Assistant Examiner—Taylor J. Ross
Attorney, Agent, or Firm—Klaas & Law

[57] ABSTRACT

Interlocking means are provided on the front and rear surfaces of adjacent clips to restrain relative movement between adjacent clips in one direction and to permit relative guided movement between adjacent clips in another direction and wherein the restraint of the relative movement is maintained for at least a substantial portion of the movement of the one of the adjacent clips toward a secured position on the support surface. Also, each clip has at least one bore means having first and second cross-sectional configurations so as to provide a shoulder and a surface penetrating fastening device having an enlarged head portion located in the bore means so that, when a force is applied to the surface penetrating fastening device to drive the surface penetrating fastening device into the support surface, the enlarged head will contact the shoulder so that the clip is firmly held in position on the support surface.

18 Claims, 4 Drawing Sheets

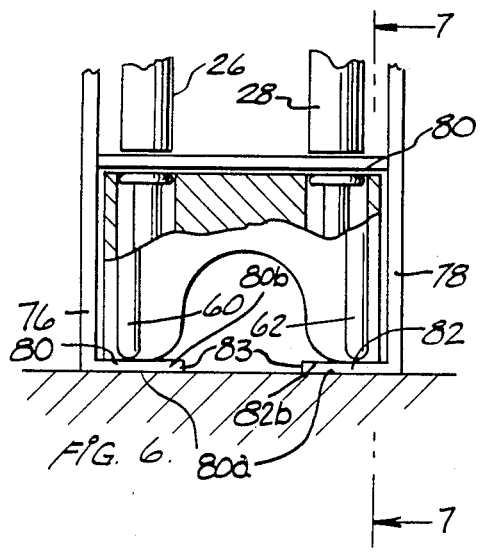
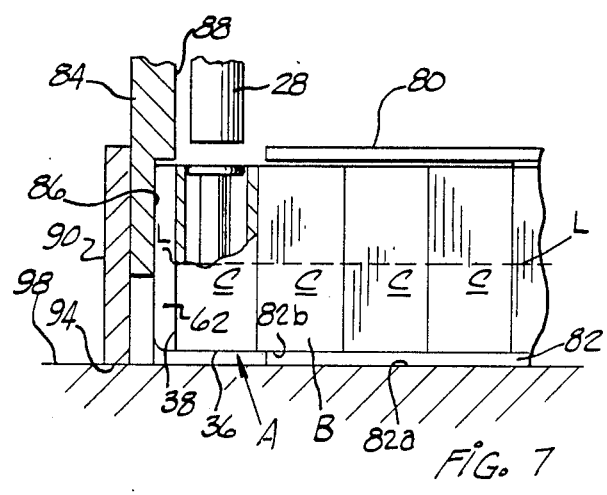
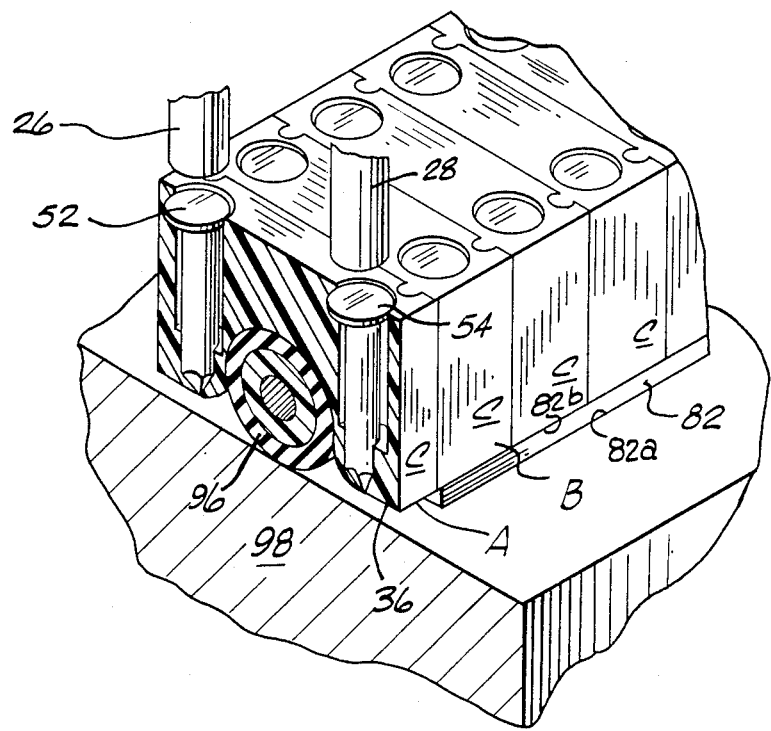

CABLE MOUNTING APPARATUS AND METHOD

This application is a continuation-in-part of U.S. patent application Ser. No. 740,802 filed June 3, 1985.

FIELD OF THE INVENTION

This invention relates to the field of fastening cable to a surface and in particular to fastening sensitive signal conducting insulated cable to a surface.

BACKGROUND INFORMATION

A common part of installing electronic equipment is the fastening of cable, such as the cable used in the telecommunications industry, to a surface such as a wall, a floor, a baseboard or other similar surfaces. The recent expansion of the telecommunication industry has caused an increase in the amount of sensitive cable being fastened to surfaces and has made more acute the need for a tool that conveniently, effectively and safely attaches such cable to surfaces and has made more acute the need for a tool that conveniently, efficiently and safely attaches such cable to a surface in a quick and efficient manner without damaging the cable.

Previous methods of fastening cable to a surface have made use of individual, manually applied clips or conventional staple guns. The use of manually applied clips to attach cable to a surface has proved to be time consuming and labor intensive, making this method economically unattractive. Attachment of cable by using a conventional staple gun is faster and more economical than use of clips, but it has been found that stapling may have a harmful effect on the cable, impairing its electrical characteristics and possibly creating safety concerns.

A conventional staple gun ejects a metal staple and often a point of the staple may lacerate the protective insulation as it passes next to the cable, or the force that must be utilized in this process may cause the cross member of the staple to crimp or cut through the insulating layer of the cable that houses the conducting wires. Thus the metal staple may cut the insulating layer thereby exposing the conducting wire and allowing moisture ingress, or it may crush the cable sufficiently to impair its ability to accurately transmit signals or it may actually sever one of the conducting wires. Furthermore, the amount of force imparted to the cable by the staple depends on the size of the cable against which it is coming into contact and the resistance offered by the surface into which the staple legs must penetrate. Therefore, a stapler with an ejection force appropriate to accommodate one cable size or one density of surface material may need adjustment before it can be safely used in another cable environment. The most common method presently used in the installation of sensitive cable is by the use of individual, manually applied clips. The need exists to make the installation of cable faster and easier while substantially eliminating crushing or severing of the cable insulation or the conducting wires.

One solution to the problem is disclosed in a copending application that discloses apparatus that includes a dual magazine staple gun in which one magazine contains protective encasements for surrounding the cable to prevent problems associated with the scraping or the crushing of the cable by a staple. A conventional staple gun having a magazine with staples is modified by providing a second housing assembly adjacent the bottom surface of the conventional stapler and substantially parallel thereto. The second housing assembly comprises a base member having a longitudinal cutout in the bottom surface and having side walls defining a chamber. A number of encasements are disposed in the chamber. The encasements have a slot on their lower surfaces which, in conjunction with the surface onto which the cable is being fastened, forms a channel for holding the cable when the clip is affixed to the surface. The clip has a foot member disposed on each side of the slot with a hole penetrating each foot member. A plurality of encasements are detachably fixed to each other in parallel fashion and disposed in the housing assembly chamber so that the feet of the encasements contact the floor of the chamber. A biasing member such as a spring has one of its ends positioned against a cover for the housing assembly and is attached at its other end to an encasement moving mechanism. The biasing member urges the encasement moving mechanism and thus the encasements forward in the housing assembly so that an encasement underlies the forwardmost of the staples in the staple gun.

In operation the slot in the base member of the housing assembly is positioned over the cable. The staple gun trigger lever is activated so as to move the forwardmost staple in the staple gun downward so that the staple legs pass through the holes in the feet of the underlying encasement the force of the ejected staple carries the encasement downward out of the staple gun so that the feet of the encasement contact the surface. The staple legs penetrate through the holes in the feet of the encasement into the surface to affix the encasement in an upright position. In this position, the slot in the underside of the encasement, in combination with the surface, defines a channel in which the cable lies. As a result, the encasement legs and cross member keep the staple spaced from the cable so that the cable is not contacted by the staple. In this manner of operation, substantially all of the momentum of the staple ejected from the staple gun is absorbed by the encasement and surface, rather than allowing the force of this momentum to be transmitted to the cable.

SUMMARY OF THE INVENTION

In general, the present invention provides a system and apparatus for rapid automated fastening of cable to a support surface by the use of a new and improved cable holding and attachment clip. The word, clip, as used in this application, comprises an insulated, protective housing that unitarily embodies surface penetrating fastening devices in such a manner so as to allow the clips to be positioned, discharged and applied in a uniform automated process. The invention also provides a new and improved applicator tool (gun-like stapling devices) which holds and positions a plurality of the clips to accurately, economically and safely fasten a cable to a support surface.

In a preferred embodiment of the invention, the housing of the clip is of a hexahedral configuration having parallel top and bottom surfaces, parallel end surfaces and parallel front and rear surfaces. A cable receiving and holding channel is provided in the bottom surface. A pair of spaced apart bore means extend through the protecting housing portion of the clip between the top and bottom surfaces. Each bore means have cylindrical sections of different diameters so as to form an internal shoulder. The smaller diameter cylindrical section terminates in a conical section and is located closer to the bottom surface of the housing than to the top surface.

Surface penetrating fastening devices are mounted in the bore means with a portion of each device frictionally engaged in the smaller diameter conical-cylindrical section and the head of the device positioned in the larger diameter cylindrical section. Means are provided to hold adjacent clips in an assembled relationship. In a preferred embodiment of the invention, this holding means comprises interlocking ribs on one of the surfaces of the housing of a clip located within interlocking grooves in the opposing surfaces of the housing of an adjacent clip.

An applicator tool is provided for positioning, ejecting and fastening a clip a cable. This applicator tool operates similarly to a conventional stapling device. A multiplicity of clips are joined together and positioned in a feed track means. A spring biasing means acts on the multiplicity of clips to position the foremost clip above a discharge chute. The applicator tool is positioned over the cable and activated so as to drive a means into contact with portions of the surface penetrating fastening devices of the clip and substantially simultaneously move the clip downwardly until it is in a fastened position around the cable and is resting on the surface on which the cable is to be fastened. Repeated activations of the driving means of the applicator tool may be needed to adequately penetrate the surface so that the clip is properly fastened on the surface.

It is an object of this invention to provide apparatus and method for automatically fastening a cable in a desired location without damage to the cable.

It is another object of this invention to provide a clip for fastening a cable in a desired position wherein the surface penetrating fastening devices are positioned within the boundaries of the housing of the clip so that the clip may be automatically positioned, ejected and fastened around the cable.

It is a further object of this invention to provide a clip for fastening a cable in a desired position wherein the surface penetrating fastening devices are positioned within the boundaries of the housing of the clip so that the clip may be automatically positioned around the cable and be fastened to a supporting surface and wherein each clip is provided with means for holding adjacent clips in an assembled relationship.

It is a further object of this invention to provide interlocking means on the surfaces of each clip so that adjacent clips may be interlocked together to form an assembled relationship of a multiplicity of clips without impairing the ability of the clips to move downwardly to a fastened position around the cable.

Many other objects and advantages of the present invention will become apparent from considering the following detailed description in connection with the drawings.

BRIEF DESCRIPTION OF THE DRAWINGS

FIG. 6 is a cross-sectional view of a portion of the applicator tool along the line 7—7 of FIG. 1;

FIG. 7 is a side elevational view with parts removed and parts in cross-section of a portion of the applicator tool having clips mounted therein;

FIG. 8-11 are pictorial views illustrating the clip during various stages of its application.

DETAILED DESCRIPTION OF THE INVENTION

Figure 1:
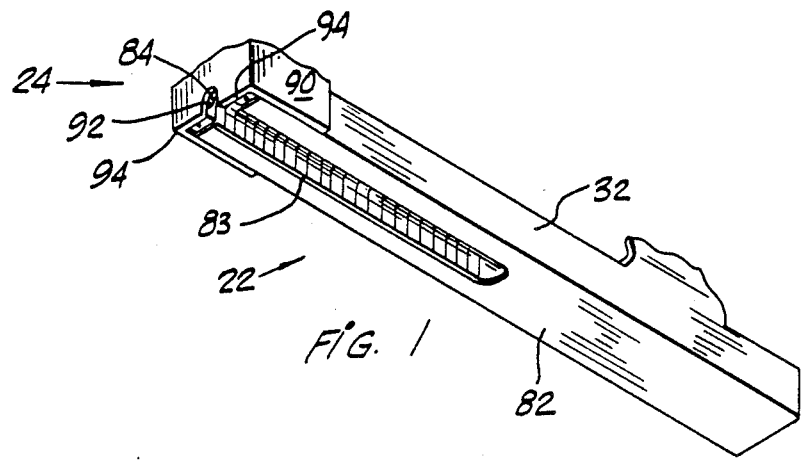
FIG. 1 is a pictorial view illustrating a portion of an applicator tool for use with this invention.
Figure 2:
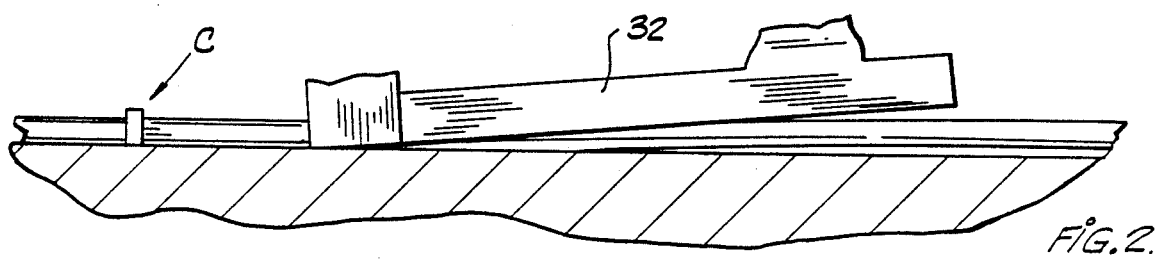
FIG. 2 is a side view of a portion of an applicator tool positioned over a cable.

In general, the clip C of the present invention comprises a housing 10 integrally molded using a plastic material and has a pair of bore means 12 and 14 located on opposite sides of a cable receiving channel means 16. The surface penetrating fastening devices in the preferred embodiment of the clip of this invention comprises a pair of nails 18 and 20 which are held and supported in a non-fastening position completely within bore means 12 and 14 prior to being driven into a support structure on opposite sides of a cable, such as a telecommunications cable, confined in channel means 16. It is understood that other types of fastening means may be used. The clip may be manufactured by forming the one piece clip member in site about the nail members by an injection molding process or the like; or by a two-step assembly process whereby the nails are placed in the housing after formation of the housing. A portion of an applicator tool 22 is illustrated in FIGS. 1 and 2 and comprises an elongated upper drive section 24 having a reciprocable means including a pair of hammer portions 26 and 28 illustrated in FIGS. 5 and 6. An elongated lower jaw section 32 provides a channel and guideway for slidably supporting a stack of the clips 10 which are held therein in adjacent abutting relationship for one by one sliding movement from a plurality of stored positions to a position in alignment with the hammer portions 26 and 28. The details of the applicator tool form no part of this invention, but it is understood that the applicator tool, except for modifications specifically described herein, will appear and function similar to conventional staple guns such as those manufactured by Duo-Fast Corporation.

The housing 10 comprises a block of suitable plastic material, such as polypropylene or polycarbonate, having a length, width and depth and in a preferred embodiment of the invention is a hexahedron having parallel side surfaces 30 and 32, parallel top and bottom surfaces 34 and 36, and parallel front and rear surfaces 38 and 40. It is to be understood that the housing block can be of other geometrical configurations. A central channel means 16 extends between the front and rear surfaces 38 and 40 and has an arcuate surface 42 with a radius of curvature approximately equal to the radius of curvature of a cable to be received therewithin. The channel means 16 also has outwardly curved terminal surface portions 44 and 46 to facilitate positioning over the cable means. The construction and arrangement is such as to enable the cable to fit completely in the channel means 16 with opposite parallel abutment surfaces of the bottom surface 36 located laterally beyond the outer periphery of the cable means so that when a clip is properly positioned over a cable and fastened to the supporting surface, a portion of the clip is in frictional abutting engagement with a portion of the cable, a portion of the cable is in frictional abutting engagement with a portion of the support surface and the bottom surface 36 of clip in contact with the supporting surface.

Figure 3:
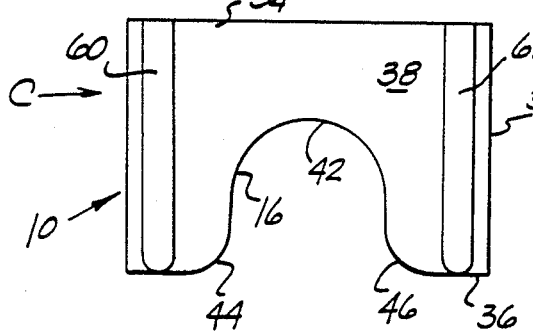
FIG. 3 is a front elevational view of a clip.
Figure 5:
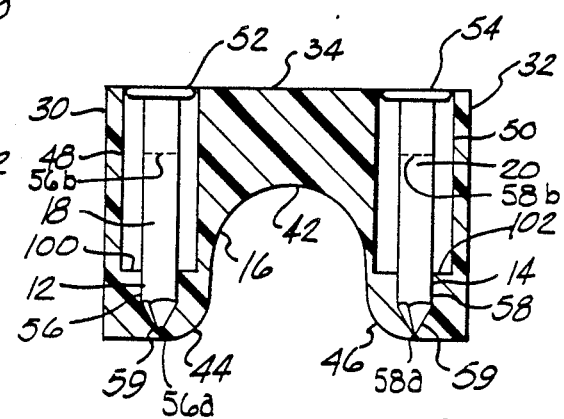
FIG. 5 is a cross-sectional view along the line 5—5 of FIG. 4.

Each of the bore means 12 and 14 is in the form of a counter bore having a first elongated relatively large diameter bore portion 48 and 50 and a second relatively short length and relatively small diameter portion, identified above and hereafter as 12 and 14. The diameter of bore portion 48 and 50 is slightly greater than the diameter of the head 52 and 54 of the nails 18 and 20. The diameter of bore portions 12 and 14 is slightly less than the diameter of nail shanks 56 and 58. As illustrated in FIG. 5, each of the shanks 56 and 58 has a surface penetrating portion having an axial length extending between the tips 56a and 58a and the dotted lines 56b and 58b that requires repeated applications of force, as explained below, until the clip C is completely fastened on the support surface. As illustrated in FIG. 3, a conical section 59 is provided in the bore portions 12 and 14 adjacent to the bottom surface 36 and is shaped so that the head of each shaft may be positioned therein. The conical section 59 is joined at the bottom to seal the bore portions 12 and 14 to form a mass into which the points of the nails 18 and 20 can be embedded to provide an additional nail restraining means. Each nail 18 and 20 is temporarily held in its associated bore means by frictional engagement with circumjacent portions of the bores with both the heads and the shanks located completely within the peripheral confines of the housing 10 of the clip C. Thus, the clip can be packaged and handled like staples and used like staples in a staple-type applicator tool having drive hammer portions 26 and 28 which enter bore portions 48 and 50 to engage and drive the nails 18 and 20 into the support surface. If desired, the nails 18 and 20 can be of other configurations, such as a T-shaped head, the bore means can be of other configurations, such as to receive a staple, and the hammer portions can be of other configurations, such as rectangular.

The housing 10 is provided with means so that one clip can be interlocked with an adjacent clip. The interlocking means comprises a pair of spaced apart ribs 60 and 62 projecting outwardly from the front surface 38 and a pair of spaced apart grooves 64 and 66 formed in the rear surface 40. It is understood that the interlocking means can comprise one or more ribs and one or more cooperating grooves. The interlocking ribs 60 and 62 are generally circular in cross-sectional configuration and have an arcuate peripheral surface extending for an arcuate distance of between about 185 degrees and 345 degrees so as to form notches 68 and 70 between the peripheral surfaces of the ribs 60 and 62 and the front surface 38. The interlocking grooves 64 and 66 are generally circular in cross-sectional configuration and have an arcuate surface extending for an arcuate distance of between about 185 degrees and 345 degrees with a slot entering into the interlocking grooves 64 and 66 so as to form resilient flange portions 72 and 74. The cross-sectional configuration of each interlocking groove is equal to or slightly larger than the cross-sectional configuration of each interlocking rib. Adjacent clips are interlocked by pushing the interlocking ribs 60 and 62 into the interlocking grooves 64 and 66 until the front surface 38 of one clip is in contact with the rear surface 40 of an adjacent clip. In the assembled relationship, the resilient flange portions 72 and 74 are seated in the notches 68 and 70 so as to hold the adjacent clips in the assembled relationship. While the interlocking grooves 64 and 66 have been described with arcuate surfaces, the grooves only have to have a cross-sectional area to accommodate the interlocking ribs and can be of any geometrical configuration as long as the appropriate flange portions 72 and 74 are provided.

The mounting of a multiplicity of clips C during the application of the clips is schematically illustrated in FIGS. 6 and 7. A multiplicity of clips in assembled relationship have a longitudinal axis L and are positioned in multiple clip feed track means comprising vertical plates 76 and 78 and horizontal plates 80 and 82. The plates 80 and 82 have abutment surface means 80a and 82a for contacting the support surface 98, as explained below, and clip supporting surface means 80b and 82b for supporting clips C. Therefore, the plates 80 and 82 each have a thickness extending between the abutment surface means 80a and 82a and the clip supporting surface means 80b and 82b. The plate 82 is provided with a slot 83 so that when the applicator tool is positioned over a cable, a portion of the cable will extend through the slot 83 and be received in the cable receiving channel means 16 of the clip. This allows the clips C to be positioned only slightly above the support surface prior to being applied to the support surface. In some instances, the slot 83 extends for a distance less than half the length of the plate, but, if desired, the slot 83 can be longer and could extend for the full length of the plate 82. In this construction, the applicator tool can be parallel to the support surface rather than the angled relationship illustrated in FIG. 2. Spring means (not shown) urge the assembled clips into contact with the front wall 84 of the applicator tool 22. The front wall 84 is provided with a pair of grooves 86 for receiving the interlocking ribs 60 and 62 so that the front surface 38 is in contact with the surface 88 of the front wall 84. The housing 10 is symmetrical so that, if the assembled clips are positioned backwards in the multiple clip feed track means, the rear surface 40 of each clip will contact the surface 88 and the hammer portions 26 and 28 will be aligned with the bore portions 48 and 50. An attachment 90 is located adjacent to the front wall 84 and is provided with a notch 92 and a supporting base 94. If desired, the attachment 90 is not used and the notch 92 is in the front wall 84. In any event, the front wall will have a notch mating with the notch 92. The distance between the notch 92 and the supporting base 92 is slightly greater than the diameter of the cable 96. The notch 92 is used with the slot 83 to properly align the applicator tool means 22 so that the clip C will be properly positioned relative to the cable 96.

As illustrated in FIG. 7, the clip C in position A is ready to be applied over the cable 96. The spring means (not shown) is holding the front surface 38 against the surface 84 with the interlocking ribs 60 and 62 seated in grooves 86. When the applicator tool 22 is actuated, the hammer portions 26 and 28 will move downwardly into contact with the heads 52 and 54. The frictional force between the shafts 56 and 58 and the relatively small bore portions 12 and 14 is sufficiently great so that the clip C in position A will move relative to the clip C in position B in a downwardly direction. Movement of the clip in position B is prevented by the portions horizontal plate 82 on either side of the slot 83. The clip in position A will continue in the downward direction until the bottom surface 36 of the clip contacts the support surface 98. The cycle of operation during the application of a clip over a cable is explained below in relation to FIGS. 8-11.

Figure 9:
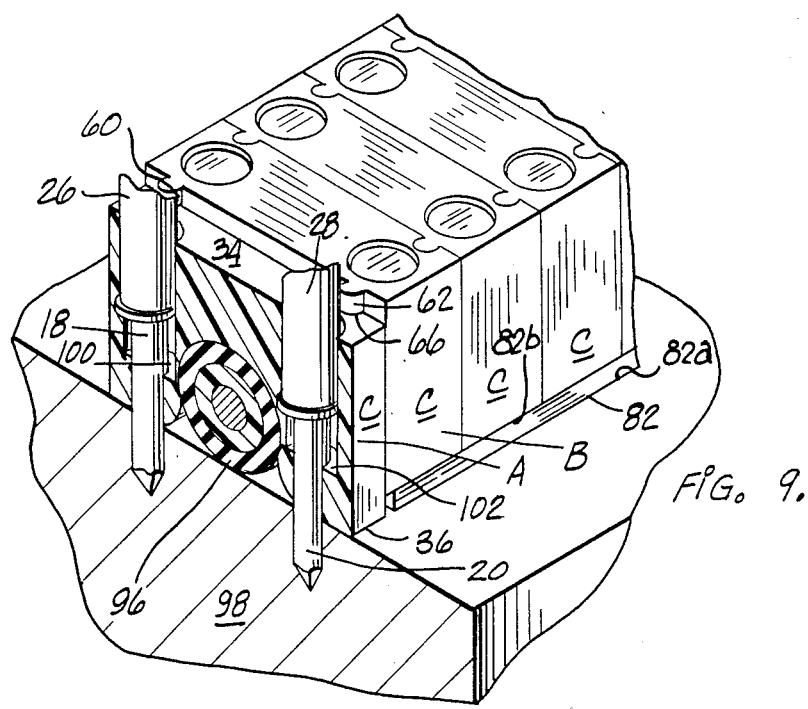
Figure 10:
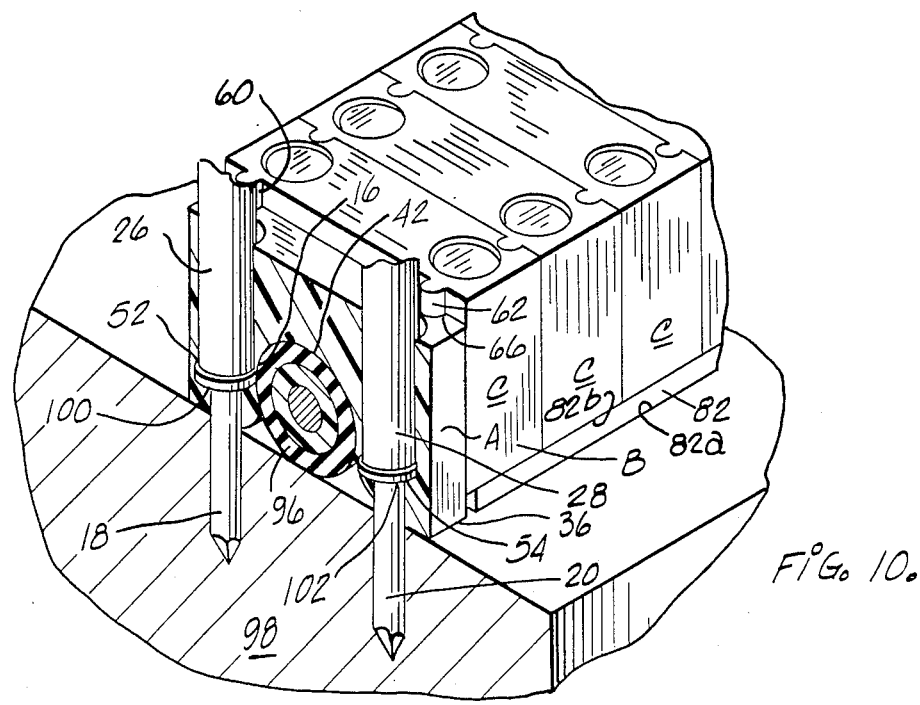

As illustrated in FIG. 9, the bottom surface 36 of the clip C is in contact with the surface 98 and the driving force of the hammer portions have driven the nails 18 and 20 downwardly into the surface 98 so that the heads 52 and 54 have moved about half way into the relatively large diameter bore portions 48 and 50 between the top surface 34 and the annular shoulders 100 and 102 formed at the junction of the relatively large diameter bore portions 48 and 50 and the relatively small diameter bore portions 12 and 14. The applicator tool device may continue to repeat the blows by the hammer portions 26 and 28 on the heads 52 and 54 of the nails 18 and 20 until the heads 52 and 54 are in contact with the annular shoulders 100 and 102 as illustrated in FIG. 10. As illustrated in FIGS. 8–11, the interlocking ribs 60 and 62 and the interlocking grooves 64 and 66 have a linear extent greater than the distance between the support surface 98 and the bottom surfaces of the row of clips whereby the bottom surface 36 on the applied clip engages the support surface 98 before the interlocking ribs 60 and 62 are completely disengaged from the interlocking grooves 64 and 66 so that the force applying means of the applicator tool device may be repeatedly actuated until the clip in position A has been fastened onto the support surface.

Figure 11:
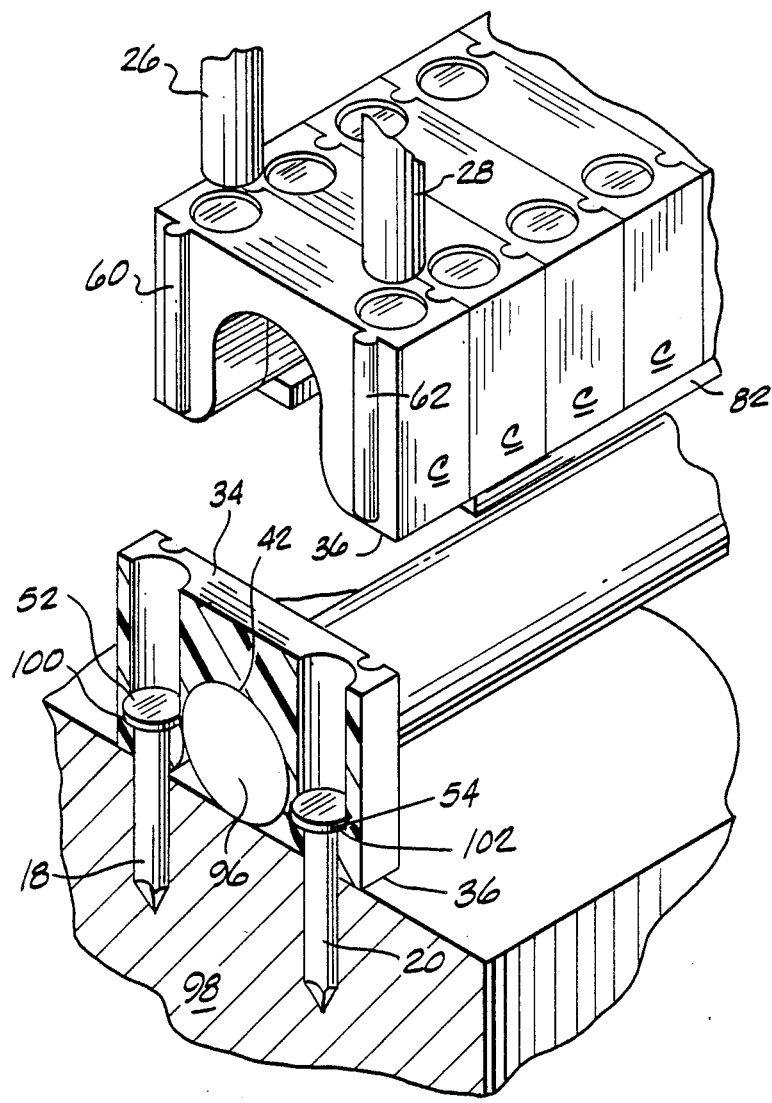

As illustrated in FIG. 10, when the clip C is in its final applied position over the cable 96 so that the surface 42 is in contact with the peripheral surface of the cable 96 a portion of the interlocking ribs 60 and 62 on the clip C in position B is still in the interlocking relationship within the interlocking grooves 64 and 66 in the clip C in position A. The applicator tool device 22, as illustrated in FIG. 11, is moved in a vertical direction so as to slide the interlocking ribs 60 and 62 out of the interlocking grooves 64 and 66. The spring means (not shown) acts on the assembled clips C so tha the clip C previously in position B now moves into position A.

The arcuate surface 42 of the channel means 16 is a semi-circle having a diameter slightly less than the diameter of the cable 96. The distance between the top of the arcuate surface 42 and the bottom surface 36 of the clip with nails 10 is also slightly less than the diameter of the cable 96. Therefore, when the clip with nails 10 is in the applied position over the cable, there will be frictional forces between the surface of the cable 96 in contact with the arcuate surface 42 and the surface of the cable 96 in contact with the support surface 98 so that relative movement between the cable 96, the clip C and the support surface 98 is resisted.

Figure 4:
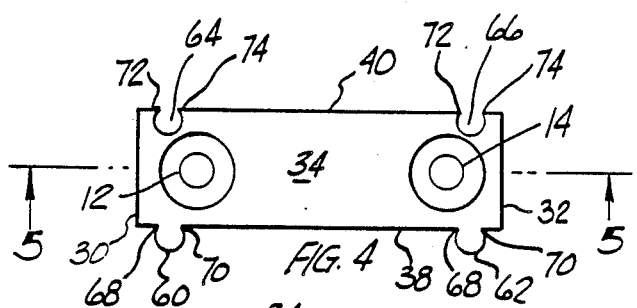
FIG. 4 is a top plan view of FIG. 3 with the surface penetrating fastening devices removed.
Figure 12:
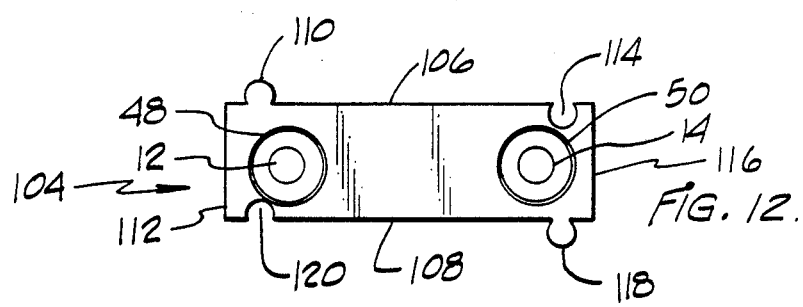
FIG. 12 is a top plan view of another embodiment of a clip for use in this invention.

Another embodiment of a clip for use in this invention is illustrated in FIG. 12. The difference between the clip illustrated in FIGS. 3–5 and the clip illustrated in FIG. 12 is the location of the interlocking ribs and grooves. The clip 104 of FIG. 12 has generally planar surfaces 106 and 108. A rib 110 projects outwardly from the surface 106 adjacent to but spaced from the side 112 of the clip 104. A groove 114 is formed in the surface 106 adjacent to but spaced from the side 116 of the clip 104. A rib 118 projects outwardly from the surface 108 adjacent to but spaced from the side 116 of the clip 104. A groove 120 is formed in the surface 108 adjacent to but spaced from the side 112 of the clip 104. The ribs 110 and 118 and the grooves 114 and 120 are shaped the same as the ribs 60 and 62 and grooves 64 and 66 and perform the same functions. Also, the cross-sectional configuration of each interlocking groove is equal to or slightly larger than the cross-sectional configuration of each interlocking rib. A major advantage resulting from the location of the ribs 110 and 118 and the grooves 114 and 120 of the clip 104 is that the clip 104 has no front or rear surface. Another clip 104 placed adjacent to the surface 106, as illustrated in FIG. 12, will always have a rib 110 or 118 to enter the groove 114 and a groove 114 or 120 for receiving the rib 110. This greatly facilitates the manufacture of the clips and also eliminates any problems associated with an incorrect loading of additional clips into the applicator tool 22. The clip 104 has nails 12 and 14 in the bore portions 48 and 50. The clip 104 functions in the same way in securing a cable 96 in place as the clip illustrated in FIGS. 3–5.

In one embodiment of the invention, the clip has a housing 10 which is integrally molded from a polypropylene material and has a length between the side portions 30 and 32 of about 0.590 inch; a width between the front 38 and rear 40 surfaces of about 0.180 inch; and a depth between the top 34 and bottom surfaces of about 0.400 inch. The large pore portions 48 and 50 have internal diameter of about 0.115 inch and the small bore portions have diameters of about 0.0475 inch. Each of the nails 18 and 20 a length of about 0.400 inch and the diameter of the shank is about 0.0475 inch. The arcuate surface 42 has a diameter of about 0.265 inch. This clip is suitable for use with a cable having an outer diameter of about 0.265 inch.

It is contemplated that the inventive concepts herein described may be variously otherwise embodied and it is intended that the appended claims be construed to include alternative embodiments of the invention except insofar as limited by the prior art.

What is claimed is:

1. A system for use in fastening an elongated object such as a cable on a support surface comprising:
   a housing having at least top and bottom surfaces, two opposite side surfaces and front and rear surfaces;
   elongated object receiving channel means extending inwardly from said bottom surface for receiving a portion of said elongated object;
   two spaced apart bore means extending through said housing and having one end opening into said bottom surface, each of said bore means having a surface penetrating fastening device positioned therein;
   each of said surface penetrating fastening devices being substantially contained within said surfaces of said housing;
   temporary retaining means for temporarily holding said surface penetrating fastening devices in said bore means until a driving force is applied to said surface penetrating fastening devices;
   each of said bore means including a first bore portion having a relatively large cross-sectional configuration and a second bore portion having a relatively small cross-sectional configuration with said second bore portion having an opening in said bottom surface;
   a shoulder formed at the junction of said first and second bore portions;
   said shoulder being located closer to said bottom surface than to said top surface;
   each of said surface penetrating fastening devices having an enlarged portion adapted to contact said shoulder to limit movement of said surface penetrating fastening device through said bore means and to secure said housing to said support surface;
   said elongated object receiving channel means being located between said two spaced apart bore means;

a multiplicity of said housings connected together in abutting relationship to provide an elongated row of said housings;

an applicator tool having means for holding said multiplicity of said housings and having a discharge chute;

means for positioning one of said multiplicity of housings over said discharge chute; and means operative from a retracted position to a driving position including a pair of spaced apart hammer head portions adapted to contact said enlarged portions to move said one of said multiplicity of housings through said discharge chute into position over said cable and for driving said surface penetrating fastening devices through said bore means and into said support surface.

2. A system as in claim 1 wherein each of said surface penetrating devices comprises:

nail means having a head integral with a shank;

said head having a cross-sectional configuration smaller than said first bore portion and greater than said second bore portion;

said head being located in said relatively large bore portion;

at least a portion of said shank being located in said second bore portion; and said head adapted to contact said shoulder when said housing has been fastened to said support surface so that the portion of said housing surrounding said second bore portion is firmly held in position between said head and said support surface.

3. A system as in claim 1 and further comprising:

said multiplicity of said housings being mounted in a front surface to rear surface abutting relationship to provide said elongated row of housings having a longitudinal axis extending therethrough;

interlocking means for holding said multiplicity of housings in said abtuting relationship; and said interlocking means restraining separation of adjacent housings in a direction generally parallel to said longitudinal axis but permitting relative sliding movement between said adjacent housings in a direction perpendicular to said longitudinal axis when a force is applied to one of said adjacent housings.

4. A system as in claim 3 wherein said interlocking means comprises:

an interlocking rib and an interlocking groove located on said front surfaces; and an interlocking rib and an interlocking groove located on said rear surfaces.

5. A system as in claim 3 wherein:

each of said surface penetrating fastening devices is completely contained with said surfaces of said housing.

6. A system as in claim 5 wherein said interlocking means comprises:

an interlocking rib and an interlocking groove located on said front surfaces; and an interlocking rib and an interlocking groove located on said rear surfaces.

7. A method of fastening an elongated object such as a cable to a support surface comprising:

providing a plurality of mounting devices, formed from a plastic material, each having at least top and bottom surfaces, two side surfaces and front and rear surfaces and at least a pair of spaced apart bore means extending therethrough between said top and bottom surfaces;

providing elongated object receiving channel means in said bottom surface between said spaced apart bore means;

locating a surface penetrating fastening device in each of said bore means so that at least a portion of said surface penetrating fastening device is located in each of said bore means;

temporarily retaining each of said surface penetrating fastening devices in said bore means for storage and handling prior to use in fastening said elongated object to said support surface;

interlocking a portion of one of said mounting devices with a portion of an adjacent one of said mounting devices to restrain movement therebetween in one direction but to permit relative guided movement therebetween in a direction perpendicular to said one direction while holding said mounting devices in an assembled relationship;

placing said mounting devices in said assembled relationship into an applicator tool and positioning said applicator tool over said elongated object;

applying a force to said surface penetrating fastening devices in one of said mounting devices to move said one of said mounting devices into a position over said elongated object;

maintaining said interlocking relationship between said one of said mounting devices and said adjacent one of said mounting devices during repeated applications of said force until said one of said mounting devices has been fastened to said support surface; and moving said adjacent one of said mounting devices relative to said one of said mounting devices to disengage said interlocking relationship.

8. An assembly of mounting devices for use in an applicator tool for attaching an elongated object such as a cable to a support surface comprising:

a plurality of individual mounting devices mounted in abutting relationship to provide an elongated row of mounting devices having a longitudinal axis extending therethrough;

each of said mounting devices having a plurality of surfaces including top and bottom surfaces, two opposite side surfaces and front and rear surfaces;

each of said mounting devices having elongated object receiving channel means in said bottom surface for receiving a portion of said elongated object;

each of said mounting devices having at least one bore means extending therethrough and having an opening in said bottom surface;

a surface penetrating fastening device having at least a portion thereof located in said at least one bore means;

each of said mounting devices having interlocking means comprising at least one interlocking rib portion on one of said surfaces and at least one interlocking groove portion in another of said surfaces;

each of said mounting devices having its interlocking rib located in the interlocking groove of an adjacent one of said mounting devices to form an interlocking relationship between adjacent mounting devices; and said interlocking relationship restraining movement between said adjacent mounting devices in one direction while permitting relative guided movement between said adjacent mounting devices in another direction until one of said adjacent mounting devices has been fastened to said support surface.

9. An assembly of mounting devices as in claim 8 wherein:
said interlocking rib portion has a generally circular cross-sectional configuration of more than 180 degrees and a stem portion connected to said one surface; and
said interlocking groove portion has a cross-sectional configuration larger than the cross-sectional configuration of said interlocking rib portion with a pair of resilient flange portions defining an elongated slot for retaining engagement with said interlocking rib portion within said interlocking groove portion to restrain movement in said one direction and for permitting relative guided movement in said another direction.

10. An assembly of mounting devices as in claim 8 in combination with an applicator tool device which comprises:
multiple mounting device feed track means for supporting said row of mounting devices in said abutting relationship so that each mounting device may be moved from a storage position to a single mounting device application position, along a linear path of movement;
a single mounting device application chamber means at one end of said feed means for receiving and confining one of said mounting devices in parallel alignment with said row of mounting devices;
means for moving said one of said mounting devices into said single mounting device application chamber means;
a single mounting device discharge chute means associated with said application chamber means for enabling movement of said one of said mounting devices from the application position to an applied position;
abutment surface means on the applicator tool device for abutting engagement with the support surface on which said one of mounting devices is to be fastened;
said one of said mounting devices in said single mounting device application chamber means having said bottom surface thereof facing said support surface;
force applying means in said applicator tool;
said interlocking means being constructed and arranged to hold said one of said mounting devices in said single mounting device application chamber means in alignment with said row of mounting devices until the application of a force thereto; and
said interlocking means having a linear extent greater than the distance between said support surface and the bottom surfaces of said mounting devices when said applicator tool is in position over said elongated object on said support surface whereby said bottom surface on said one of said mounting devices engages said support surface before the interlocking means are completely disengaged so that the force applying means of the applicator tool device may be repeatedly actuated until said one of said mounting devices has been fastened onto the support surface.

11. An assembly of mounting devices as in claim 8 wherein:
said surface penetrating fastening device is completely contained within said surfaces of said mounting device.

12. An assembly of mounting devices as in claim 8 wherein said interlocking means comprises:
an interlocking rib and an interlocking groove located on said front surfaces; and
an interlocking rib and an interlocking groove located on said rear surfaces.

13. An assembly of mounting devices as in claim 8 and further comprising:
each of said mounting devices having a length extending between said front and rear surfaces, a width extending between said opposite side surfaces and a depth extending between said top and bottom surfaces; and
wherein said interlocking means have a linear extent equal to said depth of said mounting device.

14. An assembly of mounting devices as in claim 8 wherein said at least one bore means comprises:
at least two bore means extending through said housing and having an opening in said bottom surface on each side of said elongated object receiving channel means; and
surface penetrating fastening devices having at least a portion thereof located in each of said bore means.

15. An assembly of mounting devices as in claim 14 and further comprising:
each of said bore means having an upper portion and a lower portion with a shoulder formed at the junction of said upper and lower portions; and
each of said surface penetrating fastening devices having an enlarged head portion for contacting said shoulder to hold said housing to said support surface.

16. An assembly of mounting devices as in claim 15 wherein said interlocking means comprise:
an interlocking rib and an interlocking groove located on said front surfaces; and
an interlocking rib and an interlocking groove located on said rear surfaces.

17. An assembly of mounting devices as in claim 16 and further comprising;
each of said mounting devices having a length extending between said front and rear surfaces, a width extending between said opposite side surfaces and a depth extending between said top and bottom surfaces; and
wherein said interlocking means have a linear extent equal to said depth of said mounting device.

18. An assembly of mounting devices as in claim 16 in combination with an applicator tool device which comprises:
multiple mounting device feed track means for supporting said row of mounting devices in said abutting relationship so that each mounting device may be moved from a storage position to a single mounting device application position, along a linear path of movement;
a single mounting device application chamber means at one end of said feed means for receiving and confining one of said mounting devices in parallel alignment with said row of mounting devices;
means for moving said one of said mounting devices into said single mounting device application chamber means;
a single mounting device discharge chute means associated with said application chamber means for enabling movement of said one of said mounting devices from the application position to an applied position;

abutment surface means on the applicator tool device for abutting engagement with the support surface on which said one of said mounting devices is to be fastened;

said one of said mounting devices in said single mounting device application chamber means having said bottom surface thereof facing said support surface;

force applying means in said applicator tool;

said interlocking means being constructed and arranged to hold said one of said mounting devices in said single mounting device application chamber means in alignment with said row of mounting devices until the application of a force thereto; and said interlocking means having a linear extent greater than the distance between said support surface and the bottom surfaces of said mounting devices when said applicator tool is in position over said elongated object on said support surface whereby said bottom surface on said one of said mounting devices engages said support surface before the interlocking means are completely disengaged so that the force applying means of the applicator tool device may be repeatedly actuated until said one of said mounting devices has been fastened onto the support surface.

* * * * *

UNITED STATES PATENT AND TRADEMARK OFFICE
CERTIFICATE OF CORRECTION

PATENT NO. : 4,801,064
DATED : January 31, 1989
INVENTOR(S) : Peter G. Mangone, Jr.

It is certified that error appears in the above-identified patent and that said Letters Patent is hereby corrected as shown below:

In the Abstract

Line 1     before "Interlocking" insert --A system for fastening an elongated object such as a cable to a support surface using a clip which is defined as an insulated, protective housing that unitarily embodies surface penetrating fastening devices in such a manner so as to allow the clips to be positioned, discharged and applied in a uniform automated process. The applicator has a base plate with a slot that cooperates to position the clips slightly above the support surface with a portion of the elongated object such as a cable passing through the slot.--

Col. 2, Line 27,    after "encasement" insert --.--
same Line,    cancel "the" and insert therefor --The--

Signed and Sealed this

Nineteenth Day of September, 1989

Attest:

DONALD J. QUIGG

Attesting Officer           Commissioner of Patents and Trademarks